United States Patent [19]

Matsui et al.

[11] Patent Number: 4,729,846

[45] Date of Patent: Mar. 8, 1988

[54] METHOD FOR MANUFACTURING LEPIDOCROCITE

[75] Inventors: Yasushi Matsui, Yokohama; Norio Koike, Tokyo; Kunio Takahashi, Yokohama; Hiroshi Matsue, Hiratsuka, all of Japan

[73] Assignee: Showa Denko Kabushiki Kaisha, Tokyo, Japan

[21] Appl. No.: 4,943

[22] Filed: Jan. 20, 1987

[30] Foreign Application Priority Data

Jan. 17, 1986 [JP] Japan ............................ 61-7309

[51] Int. Cl.$^4$ ............................................. C01G 49/02
[52] U.S. Cl. ................................. 252/62.56; 423/632; 423/634
[58] Field of Search ................... 423/632, 634; 252/62.56

[56] References Cited

U.S. PATENT DOCUMENTS

| | | | |
|---|---|---|---|
| 2,560,971 | 7/1951 | Martin | 252/62.56 |
| 3,082,067 | 3/1963 | Hund | 423/634 |
| 3,904,540 | 9/1975 | Bennetch et al. | 423/634 |
| 4,086,174 | 4/1978 | Bennetch | 252/62.56 |
| 4,108,787 | 8/1978 | Masaki et al. | 423/634 |
| 4,136,158 | 6/1979 | Okuda et al. | 423/632 |
| 4,176,172 | 11/1979 | Bennetch et al. | 252/62.56 |
| 4,221,776 | 9/1980 | Autzen et al. | 423/632 |
| 4,323,464 | 4/1982 | Umeki | 423/634 |
| 4,396,596 | 8/1983 | Ogisu et al. | 423/634 |
| 4,464,352 | 8/1984 | Autzen et al. | 252/62.56 |
| 4,497,723 | 2/1985 | Ohlinger et al. | 252/62.56 |

FOREIGN PATENT DOCUMENTS

| | | | |
|---|---|---|---|
| 55-6575 | 2/1980 | Japan | 423/632 |
| 55-6576 | 2/1980 | Japan | 423/632 |
| 55-7929 | 2/1980 | Japan | 423/632 |
| 59-48766 | 11/1984 | Japan | 423/632 |
| 59-50607 | 12/1984 | Japan | 423/632 |

Primary Examiner—Patrick P. Garvin, Sr.
Assistant Examiner—Paige C. Harvey
Attorney, Agent, or Firm—Sughrue, Mion, Zinn, Macpeak & Seas

[57] ABSTRACT

Lepidocrocite ($\gamma$-FeOOH) with an large specific surface area and a uniform particle size is provided by a method comprising preparing a suspension of ferrous hydroxide at a pH of 6.5 to 7.5 by adding a ferrous salt solution with an alkali solution in an amount of 0.4 to 0.7 times the theoretical amount for converting all the ferrous salt to ferrous hydroxide, blowing an oxygen-containing gas into the suspension to form a seed crystal of $\gamma$-FeOOH, completing the generation reaction of $\gamma$-FeOOH by blowing an oxygen-containing gas into the suspension while adding an alkali solution to keep the pH of the suspension within a range of 3 to 5, in which an Si concentration of the suspensions for seed reaction and for generation reaction of $\gamma$-FeOOH is controlled to be within 5 to 30 ppm.

5 Claims, 4 Drawing Figures

METHOD FOR MANUFACTURING LEPIDOCROCITE

BACKGROUND OF THE INVENTION

1. Field of the Invention

The present invention relates to a method for manufacturing lepidocrocite ($\gamma$-FeOOH). More specifically, it relates to a method for manufacturing lepidocrocite suitable as a starting material in the manufacture of magnetic powders for magnetic recording media, such as audio tapes, video tapes, magnetic disks and magnetic cards.

2. Description of the Related Art

Generally, magnetic iron oxide powders for magnetic recording media such as audio tapes, video tapes, magnetic disks and magnetic cards are produced from goethite ($\alpha$-FeOOH) or lepidocrocite ($\gamma$-FeOOH) as a starting material. $\alpha$-FeOOH or $\gamma$-FeOOH is subjected to treatments such as calcination (for dehydration and inter-sintering), reduction, and oxidation to obtain maghemite ($\gamma$-Fe$_2$O$_3$) which are needle-shaped (acicular) magnetic iron oxide powders. The $\gamma$-Fe$_2$O$_3$ powders may be subjected to a further treatment of cobalt modification, to provide cobalt-coated $\gamma$-Fe$_2$O$_3$ powders (Co-$\gamma$-Fe$_2$O$_3$). Further, acicular $\alpha$-FeOOH or $\gamma$-FeOOH is subject to a treatment such as hydrogen gas reduction while maintaining the acicular shape of the starting material, to produce acicular magnetic metal iron powders.

In the above cases, the magnetic properties of the resultant magnetic powders depends on the characteristics of the starting material. Therefore, to obtain magnetic powders suitable for magnetic recording media, it is necessary to use a starting material having narrow particle size distribution, good shape and crystal structure.

Heretofore, magnetic powders produced from $\gamma$-FeOOH (lepidocrocite) as the starting material provide magnetic recording media, as the final products, such as an audio tape and a video tape which have and excellent magnetic orientability, squareness ratio, and print-through level. But the particle size distribution of the magnetic powders produced from $\gamma$-FeOOH is so wide that the switching field distribution of the magnetic recording media as the final products become high. As a result, at present, $\alpha$-FeOOH (goethite) is nearly always used as the starting material for the production of $\gamma$-Fe$_2$O$_3$.

SUMMARY OF THE INVENTION

An object of the present invention is to provide a method for producing lepidocrocite which has an narrow particle size distribution, and further, an large specific surface area (i.e., small particle size).

Another object of the present invention is to provide a method for producing lepidocrocite which allows the provision of magnetic powers such as magnetic iron oxide powders and magnetic metal powders, and magnetic recording media such as audio and video tapes, which have superior magnetic properties, e.g., coercivity, switching field distribution, squareness ratio, magnetic orientation, and print-through level.

The inventors investigated the effects of various minor ingredients in reactions when forming a seed crystal of lepidocrocite and during the crystal growth of lepidocrocite. It is found that the resultant lepidocrocite powders have narrow particle size distribution and large specific surface area by controlling the very low concentrations of Si during seed reaction and growth reaction of lepidocrocite. As a result, the present invention was attained.

The present invention thus attained resides in a method for manufacturing lepidocrocite, comprising the steps of: preparing an aqueous suspension of ferrous hydroxide at a pH of 6.5 to 7.5 by mixing a ferrous salt and an alkali in an amount of 0.4 to 0.7 times the theoretical amount for converting all the ferrous salt to ferrous hydroxide, wherein the Si concentration of the suspension is controlled within a range of 5 to 30 ppm; blowing an oxygen-containing gas into the suspension to form a seed crystal of $\gamma$-FeOOH; and completing generation (growth) reaction of $\gamma$-FeOOH by blowing an oxygen-containing gas into the suspension with adding an alkali solution to keep the pH of the suspension within a range of 3 to 5, wherein the Si concentration of the suspension during the growth reaction is controlled within a range of 5 to 30 ppm.

DESCRIPTION OF THE PREFERRED EMBODIMENTS

Figure 1:
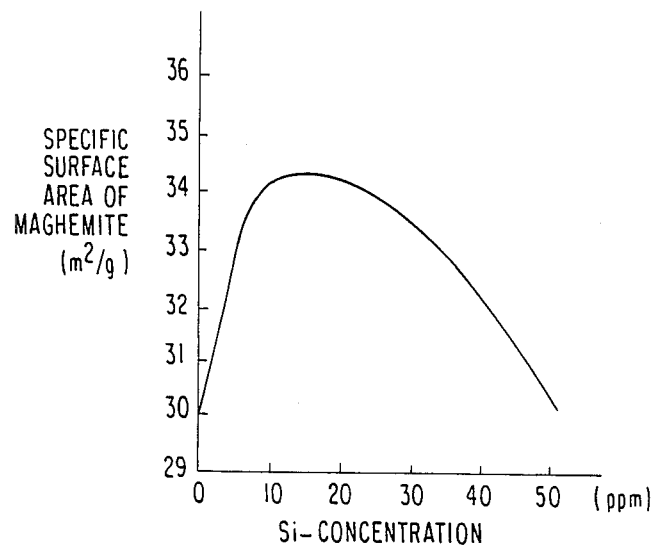
FIG. 1 is a graph showing the relationship between the specific surface area of maghemite and the concentration of Si.

A method for manufacturing lepidocrocite according to the present invention is further described below. Note, the steps and conditions thereof are the same as those of conventional methods for manufacturing lepidocrocite, except that the Si concentrations are controlled.

First, a suspension of ferrous hydroxide is prepared by mixing an aqueous solution of a ferrous salt such as ferrous chloride and ferrous sulfate and an aqueous solution of alkali such as caustic hydroxide and ammonia. The ferrous salt solution may be a waste from washing an iron containing material (e.g., a steel strip) with an acid. The amount of the alkali solution is 0.4 to 0.7 times the theoretical amount for converting all of the ferrous salt to ferrous hydroxide and the pH of the suspension is within a range of 6 to 7.5. These conditions are necessary to prevent the formation of goethite and to obtain a lepidocrocite crystal having an excellent needle shape.

According to the present invention, the suspension of ferrous hydroxide is controlled so that the Si concentration of the suspension is within a range of 5 to 30 ppm, preferably 7 to 24 ppm. The Si concentration may be controlled, for example, by adding a silicate such as sodium metasilicate.

Then an oxygen-containing gas such as air or oxygen is blown into the suspension of ferrous hydroxide at a pH of 6.5 to 7.5 to form seed crystal (nucleus) of $\gamma$-FeOOH (lepidocrocite).

After the seed crystal of γ-FeOOH is formed, a generation reaction of γ-FeOOH is carried out by blowing an oxygen-containing gas such as air or oxygen while adding an aqueous solution of alkali such as caustic alkali or ammonia, while keeping the pH of the suspension within a range of 3 to 5. According to the present invention, the Si concentration of the suspension during the generation reaction of γ-FeOOH is also controlled to be within a range of 5 to 30 ppm, preferably 7 to 24 ppm. This control of the Si concentration may be preferably carried out by controlling the Si concentration of the alkali solution to be added for the generation reaction to be within a range of 5 to 30 ppm, preferably 7 to 24 ppm, based on the suspension after the alkali solution is added. The Si concentration of the alkali solution may be controlled, e.g., by adding a silicate to the alkali solution.

Upon completion of the generation reaction, according to the present invention, a lepidocrocite crystal having a narrow particle size distribution and an large specific surface area is obtained. With such a lepidocrocite, a magnetic powder and a magnetic recording medium can be obtained, as a final product, having not only an excellent magnetic orientability, dispersibility, squareness ratio, and print-through level, but also a higher coercivity and low switching field distribution. The role or effect of Si, which gives the advantages as mentioned above, is not clear, but it is supposed that Si prevents sintering of the powders each other during a later calcination step. It was, however, confirmed by experiments that the desired results cannot be attained by an Si concentration not within the range mentioned above, i.e., 5 to 30 ppm.

Note, the addition of a water-soluble silicate or $SiO_3^{2-}$ in the production of α-FeOOH (goethite) or magnetic iron oxide powders from α-FeOOH is known, for example, in U.S. Pat. No. 4,136,158 (issued on Jan. 23, 1979) and Japanese examined patent publication (Kokoku) Nos. 55-6575 and 55-6576 (both published on Feb. 18, 1980), 55-7972 (published on Feb. 29, 1980, 59-48766 (published on Nov. 28, 1984) and 59-50607 (published on Dec. 10, 1984). These publications disclose methods for manufacturing goethite in which a water-soluble silicate is added to a dispersion of ferrous hydroxide in an amount of 0.1 to 17 atomic % calculated as Si in the presence of $Zn^{2+}$ as well as methods for manufacturing magnetic iron oxide powders from or through α-FeOOH in which α-FeOOH powders are coated with $SiO_2$ by adding a water-soluble silicate in an amount of 0.5 to 5 mole % calculated as $SiO_2$ based on Fe. However, the so-called wet synthesis methods for manufacturing goethite and lepidecrocite each have quite different processes and conditions, i.e., starting materials, temperature, pH, etc. For example, U.S. Pat. No. 4,136,158 discloses that the formation of acicular iron (III) oxide hydroxide is conducted by oxidizing an iron (II) hydroxide suspension at a pH of at least 11 with an oxygen-containing gas. In this condition, i.e., at a pH of at least 11, α-FeOOH is necessarily produced. Further, the resulting geothite and lepidocrocite particles have a different crystal structure and particles shape (goethite has a bar shape and lepidocrocite has a raft shape). Therefore, in these two methods of manufacturing goethite and lepidocrocite, first the amount of addition of Si is different, and further, the solution or suspension to which Si is to be added and the step in which Si is to be added are different. Still further, the effects of the addition of Si are different in these two methods. In the manufacture of goethite, the effects of the addition of a silicate are a uniformity of the particle size and a prevention of formation of dendolite crystals, while the effects of control of the amount of Si in the manufacture of lepidocrocite according to the present invention are an increase in the specific surface area, i.e., decrease of the particle size, and a uniformity of the particle size.

EXAMPLES

While 25 liters of aqueous ferrous chloride solution having a concentration of 0.97 mole/l was kept in a reactor under nitrogen atmosphere and stirred, 45 liters of an aqueous sodium hydroxide solution having a concentration of 0.71 mole/l was added, and sodium metasilicate was then added to vary the concentration of Si in the mixture in a range from 1 to 50 ppm. The pH of the mixture or the resultant suspension of ferrous hydroxide was kept at 7.5.

Into the suspension having the respective Si concentration, which was kept at 13° C, air was blown at a flow rate of 20 l/min to oxidize the ferrous hydroxide in the suspension and thus form seed crystal of γ-FeOOH.

After the completion of the seed reaction was confirmed by measuring the pH of the suspension (pH=3.2), the temperature of the suspension was raised to 45° C. and air was blown into the suspension at a changed flow rate of 3 l/min while an aqueous sodium hydroxide solution, the Si concentration of which was controlled to be in a range of 1 to 50 ppm based on the total of the suspension and the sodium hydroxide solution, was added at a constant rate of 80 g/min. This operation i.e., blowing an oxygen-containing gas while adding the sodium hydroxide solution was continued until the pH of the suspension reached to 5.5. Thus, lepidocrocite having a needle shape (acicular particle) was obtained.

In the above examples, the Si concentrations of the suspension during the formation of seed crystal and during the generation reaction were made the same value in each case.

Further, for comparison, the same procedures as in above examples were repeated except that the Si concentrations of the suspension for the seed reaction and of the sodium hydroxide solution for generation reaction, were almost zero.

Figure 2:
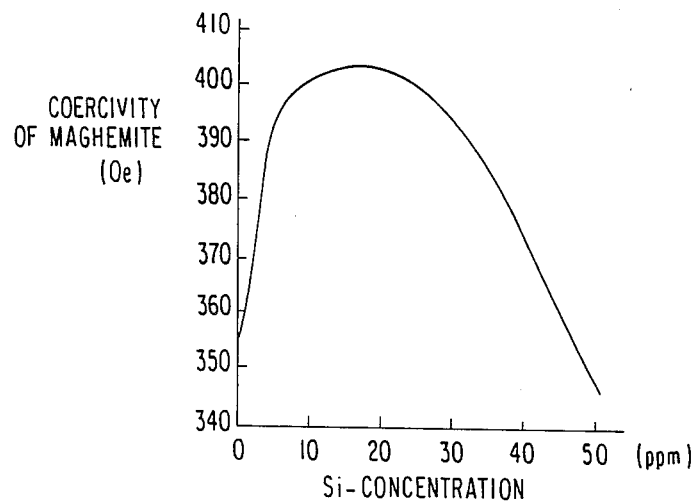
FIG. 2 is a graph showing the relationship between the coercivity of maghemite and the concentration of Si.

Thus resultant lepidocrocites were calcined, reduced, and oxidized in a conventional manner to produce acicular γ-$Fe_2O_3$ (maghemite). The specific surface area and coercivity of the powders of acicular γ-$Fe_2O_3$ were measured, and the results are shown in FIGS. 1 and 2, respectively.

Figure 3:
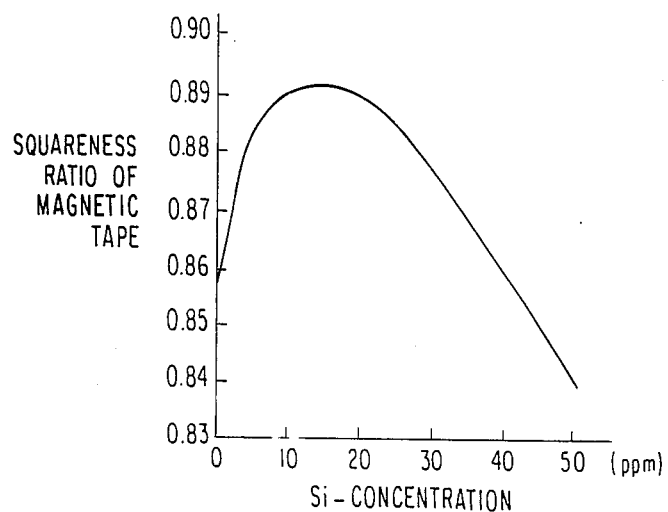
FIG. 3 is a graph showing the relationship between the squareness ratio of a magnetic tape and the concentration of Si; and, FIG. 4 is a graph showing the relationship between the switching field distribution of a magnetic tape and the concentration of Si.
Figure 4:
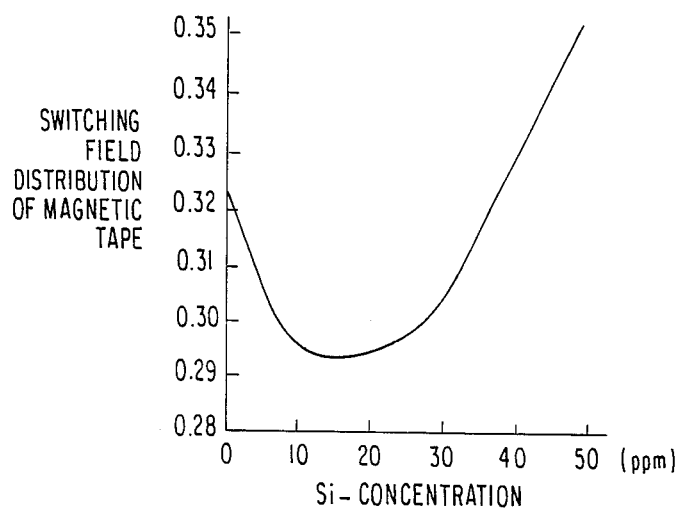

Further, the above acicular γ-$Fe_2O_3$ (maghemite) was chased and made into a coating material, which was coated onto a plastic base film and subject to orientation treatment under a magnetic field as in a conventional process, to obtain a magnetic tape. The magnetic properties, i.e., the squareness ratio and the switching field distribution, of the magnetic tape were measured. The switching field distribution was measured by vibrating sample magnetometer (VSM). The results are shown in FIGS. 3 and 4, respectively. From FIGS. 1 to 4, it is seen that, if the Si concentration is in a range of 5 to 30 ppm, particularly in a range of 7 to 24 ppm, the magnetic properties of the resultant maghemite powders and magnetic tape, as well as the specific surface area of the maghemite powders, are excellent. Here, a narrow switching filed distribution of a magnetic tape denotes a narrow distribution of the particle size of the magnetic powders.

We claim:

1. A method for manufacturing lepidocrocite, comprising the steps of:
   preparing an aqueous suspension of ferrous hydroxide at a pH of 6.5 to 7.5 by mixing a ferrous salt and an alkali in an amount of 0.4 to 0.7 times the theoretical amount for converting all of the ferrous salt to ferrous hydroxide, wherein the Si concentration of the suspension is controlled to be within a range of 5 to 30 ppm;
   blowing an oxygen-containing gas into the suspension to form a seed crystal of $\gamma$-FeOOH; and
   completing a generation reaction of $\gamma$-FeOOH by blowing an oxygen-containing gas into the suspension while adding an alkali solution and keeping the pH of the suspension within a range of 3 to 5, wherein the Si concentration of the suspension during the generation reaction is controlled to be within a range of 5 to 30 ppm.

2. A method according to claim 1, wherein the Si concentration of the suspension of ferrous hydroxide in preparing said aqueous suspension is controlled to be within a range of 7 to 24 ppm.

3. A method according to claim 1, wherein the Si concentration of the suspension during the generation reaction of $\gamma$-FeOOH is controlled to be within a range of 7 to 24 ppm.

4. A method according to claim 1, wherein the Si concentration of the suspension of ferrous hydroxide is controlled by adding a silicate to the suspension.

5. A method according to claim 1, wherein the Si concentration of the suspension during the generation reaction of $\gamma$-FeOOH is controlled by controlling the Si concentration of the alkali solution added to the suspension for the generation reaction of $\gamma$-FeOOH.

* * * * *